United States Patent [19]
Raczkowski

[11] 3,916,291
[45] Oct. 28, 1975

[54] POWER GENERATING ARRANGEMENT EMPLOYING SYNCHRONOUS DYNAMOELECTRIC MACHINE HAVING IMPROVED DYNAMIC AND TRANSIENT STABILITY

[75] Inventor: Czeslaw Raczkowski, Pittsburgh, Pa.
[73] Assignee: Westinghouse Electric Corporation, Pittsburgh, Pa.
[22] Filed: Aug. 30, 1973
[21] Appl. No.: 392,910

[52] U.S. Cl. .................. 322/19; 322/24; 322/28; 322/29
[51] Int. Cl.² .......................................... H02H 7/06
[58] Field of Search ............. 322/7, 19, 20, 24, 25, 322/28, DIG. 2, 29; 323/100; 318/610

[56] References Cited
UNITED STATES PATENTS

| | | | |
|---|---|---|---|
| 2,913,656 | 11/1959 | Bliss | 322/19 X |
| 3,032,698 | 5/1962 | Long et al. | 322/DIG. 2 X |
| 3,477,014 | 11/1969 | Blythe | 322/28 X |
| 3,621,369 | 11/1971 | Nagae et al. | 322/28 X |
| 3,754,183 | 8/1973 | Ibamoto et al. | 322/28 |
| 3,775,666 | 11/1973 | Smith | 322/28 |

Primary Examiner—J. D. Miller
Assistant Examiner—Robert J. Hickey
Attorney, Agent, or Firm—G. H. Telfer

[57] ABSTRACT

It has been determined that the transfer function of a synchronous dynamoelectric machine connected to an electric system through a transmission line contains complex roots in its numerator and denominator. This transfer function describes the dynamic relationship between deviation of the terminal voltage of a synchronous dynamoelectric machine from the desired (reference) value and a deviation in the field voltage of that machine. The above-mentioned complex root function of the total transfer function of the machine deleteriously affects the dynamic and transient characteristic and stability of the machine. Accordingly, a compensating network is utilized to modify the field voltage in such a fashion that the effect of the complex root function on the relationship between the field voltage and the terminal voltage is minimized. Such a compensating network may be located at various places in the excitation circuitry of the dynamoelectric machine and may be appropriately modified as required by the characteristics of a given machine.

9 Claims, 3 Drawing Figures

POWER GENERATING ARRANGEMENT EMPLOYING SYNCHRONOUS DYNAMOELECTRIC MACHINE HAVING IMPROVED DYNAMIC AND TRANSIENT STABILITY

BACKGROUND OF THE INVENTION

1. Field of the Invention

This invention relates generally to a power generating arrangement utilizing a synchronous dynamoelectric machine, and more specifically, this invention relates to a power generating arrangement in which a compensating network is utilized to minimize the effects of the complex root function in the equation defining the relationship of the terminal voltage and field voltage of a synchronous dynamoelectric machine.

2. Description of the Prior Art

The stable operation of a synchronous dynamoelectric machine (i.e., its ability to maintain synchronism during both steady state and transient conditions, such as those arising from certain changes in load, changes in circuit configuration, or during and following short circuits) is one of the basic requirements for the reliable performance of an electrical power system. It is also highly desirable that oscillations caused by various disturbances, which are always present in an electrical system, be damped as quickly as possible.

It is well known that the amount of electrical power that a single synchronous generator can deliver to a power system to which it is connected is limited by the ability of the generator to stay in synchronism with the power system. If a synchronous generator delivers power to a system represented by an infinite bus (i.e., the equivelant of a large system) through a transmission line having a reactance $X_3$, the basic formula for the power delivered, neglecting the resistance of the transmission line and of the synchronous generator, is given by the formula:

$$P = \frac{E_i E_s}{X_s + X_e} \sin a$$

where,
$E_i$ is the internal voltage of the synchronous generator,
$E_s$ is the system voltage,
$X_s$ is the synchronous reactance of the synchronous generator,
$a$ is the angle between $E_i$ and $E_s$, defined as the torque angle.

For given system conditions and a constant internal voltage $E_i$ (i.e., a constant excitation), stable operation is possible if the so-called synchronizing coefficient:

$$\frac{dP}{da} = \frac{E_i E_s}{X_s + X_e} \cos a$$

is positive. In other words, for the conditions that have been assumed (i.e., a round rotor machine with the resistance of the line and of the dynamoelectric machine neglected), the angle $a$ must be less than 90°.

The maximum power which a synchronous dynamoelectric machine can deliver with a fixed (constant) excitation is called the steady state stability limit. In the case that we are discussing (i.e., round rotor machine with resistance of the line and the machine neglected), the maximum power is:

$$\frac{E_i E_s}{X_s + X_e}.$$

From the first equation given above, it may be seen that this maximum power is realized when the torque angle $a$ is 90°. (For a salient pole machine, the torque angle of maximum power is 10° to 20° less).

If emergency conditions require a greater power transfer capability, it is usually necessary to decrease the reactance $X_e$, either by building more transmission lines or by series capacitor compensation. It has long been thought that an automatic voltage regulator would allow stable operation above the steady state stability limit. Theoretically, such operation is possible. However, analytical studies and field tests have shown that conventional voltage regulators will cause oscillatory performance of a synchronous generator well below the steady stability limit. In other words, the practical dynamic stability limit (i.e., maximum power capability when the machine is under automatic voltage regulator control) is well below the steady state stability limit. Improvement in the dynamic stability limit can be obtained by lowering the voltage regulator gain. This solution is impractical for two reasons: (1) it gives very poor voltage control (i.e., a large voltage error occurs when the loading of the machine changes) and very slugglish performance; and (2) it conflicts with the the important requirement that high gain of the voltage regulator be available for transient performance during and following short circuits.

A variety of supplementary signals that attempt to improve the dynamic performance of synchronous generators operating at high torque angles have been utilized in prior art devices. All of these devices utilize various combinations of lead-lag networks. The input signals are derived from deviations in frequency, power, armature current or rotor speed. When properly applied and adjusted, they reduce the duration of the oscillations induced in the machine after disturbance, but they do very little to increase the machine's dynamic stability limit.

Therefore, prior art power generating arrangements are incapable of substantially increasing the dynamic stability limit of synchronous dynamoelectric machines without imparing transient performance and damping characteristics, as well as general system response. The inability to overcome these problems has plagued the power generating field and created numerous problems.

SUMMARY OF THE INVENTION

In order to increase the dynamic stability limit, while at the same time improving transient performance and damping at high torque angles, the present invention utilizes a compensating network to minimize the effect of the complex root function on the relationship between the terminal voltage and the field voltage of a synchronous dynamoelectric machine. While the descriptionn of the preferred embodiment herein relates to a synchronous generator, it should be recognized that the same approach may be utilized to improve the dynamic and transient stability of a synchronous motor.

As an example of one approach to compensating for the complex root function, excitation for the field winding of the sychronous machine may be obtained from an excitation source, such as a rotary exciter. In this approach, the compensating network would be utilized to modify the excitation provided by the excitation source in a manner approximating as closely as possible the inverse of the complex root function, over the desired operating range.

A method of implementing this exemplary approach would be to utilize a reference source that produces a reference signal indicative of the desired excitation to be applied to the field winding. This refernece signal is applied to a first summing node, together with a feedback signal indicative of the terminal voltage of the dynamoelectric machine. A supplementary signal indicative of another machine parameter, such as power, frequency, speed or voltage, could also be appled to the first summing node by means of a supplementary feedback loop. The input to the excitation source could be controlled by a voltage regulator, with a feedback containing a damping module from the output of the excitation source to the input of the voltage regulator. The input of the voltage regulator would be obtained from a second summing node, which compares the output of the first summing node and the feedback through the damping module to produce the requisite input signal for the voltage regulator, and hence the excitation circuit.

The complex root compensating network may be located in any of a number of places. One preferred location would be directly between the first and second summing nodes, in order to directly control the signals being applied to the excitation source. Another approach would be to locate the compensating network in the feedback path that couples the terminal voltage to the first summing node. Yet another approach, if a supplementary signal is utilized, would be to locate the complex root compensating network in the supplementary feedback path. Still another approach, if a supplementary signal is used, would be to locate one complex root compensating network in the supplementary feedback path and a second compensating network between the first and second summing nodes. Of course, appropriate modification of the elements of the compensating network would have to be made depending upon the path in which the compensating network is located.

A preferred form of the compensating network, although any appropriate compensating arrangement would suffice, may be described in terms of an input and an output voltage of the network. The first summing node (which is the third summing node referred to in the system) compares the input and output voltages to provide a signal for a first integrator circuit. The integrator circuits referred to herein may be approximated by an appropriate simple time delay circuit. The output of the first integrator circuit is conveyed to a second summing node (fourth system summing node) together with the input signal altered by a first constant. A second integrator circuit is connected to the output of the second summing node and, in turn, produces an output which is applied to a third summing node (fifth system summing node). The input signal altered by a second constant is also applied to the third summing node. The output of the third summing node is altered by a third constant and fed back to the second summing node. In addition, the output of the third summing node is altered by a fourth constant to provide the output signal. The first, second, third and fourth constants may be adjusted to provide the desired compensating characteristics of the complex root compensating network for the purpose of modification of the field winding excitation.

With this arrangement, the dynamic stability limit of a synchronous dynamoelectric machine is substantially increased. At the same time, substantial improvement of the damping characteristics when the machine is operated at high torque angles and transient performance of the machine are realized. Therefore, a very significant advance has been provided in the power generating field. The foregoing and other objects, advantages and features of this invention will hereinafter appear, and for purposes of illustration, but not of limitation, an exemplary embodiment of the subject invention is shown in the appended drawing.

DETAILED DESCRIPTION OF THE PREFERRED EMBODIMENT

For a small perturbation around an operating point, the relationship between the terminal voltage deviation $\Delta E_T$ and the field voltage deviation $\Delta E_{FLD}$ of a synchronous dynamoelectric machine connected to a power system is:

$$\frac{\Delta E_T}{\Delta E_{FLD}} = \frac{A_2 S^2 + A_1 S + A_0}{B_3 S^3 + B_2 S^2 + B_1 S + B_0}$$

where S is the differential operator $d/dt$ and $A_0$, $A_1$, $A_2$, $B_0$, $B_1$, $B_2$ and $B_3$ are constants that depend on the operating point (load, angle, etc.), machine characteristics and system equivalent impedance. In the frequency range which is of interest to stability problems, (i.e., in the range between 0 and 20 rad/sec), the equation given above describes with sufficient accuracy the characteristic of a synchronous machine.

Another form of the equation given above is:

$$\frac{\Delta E_T}{\Delta E_{FLD}} = \frac{A_2}{B_2} \frac{1}{S - r_0} \frac{(S - r_1 + jw_1)(S - r_1 - jw_1)}{(S - r_2 + jw_2)(S - r_2 - jw_2)} =$$

$$KG_1(S) \times G_2(S)$$

where
$r_1 \pm jw_1$ — complex root of numerator
$r_2 \pm jw_2$ — complex root of denominator
$r_0$ — real root of denominator (negative if operating point is below steady state stability limit; positive if operating point is above the steady state stability limit).
$K = A_2/B_2$
$G_1(S) = 1/(S - r_0)$
$G_2(S) = (S - r_1 + jw_1)(S - r_1 - jw_1)/(S - r_2 + jw_2)(S - r_2 - jw_2)$ It has been determined that the complex root function $G_2(S)$ contributes to the instability of the dynamoelectic machine under dynamic and transient conditions and at high torque angles. Thus, a compensating network is required to eliminate, or at least minimize, the effect of the complex root function. Ideally, the complex root compensating network will have a transfer function of $1 / G_2(S)$, which obviously cannot be obtained by any practical combination of lead-lag networks. Therefore, it is necessary to provide a compensating network that has a transfer function approximating the inverse of the complex root function over the desired range of operating conditions.

Figure 1:
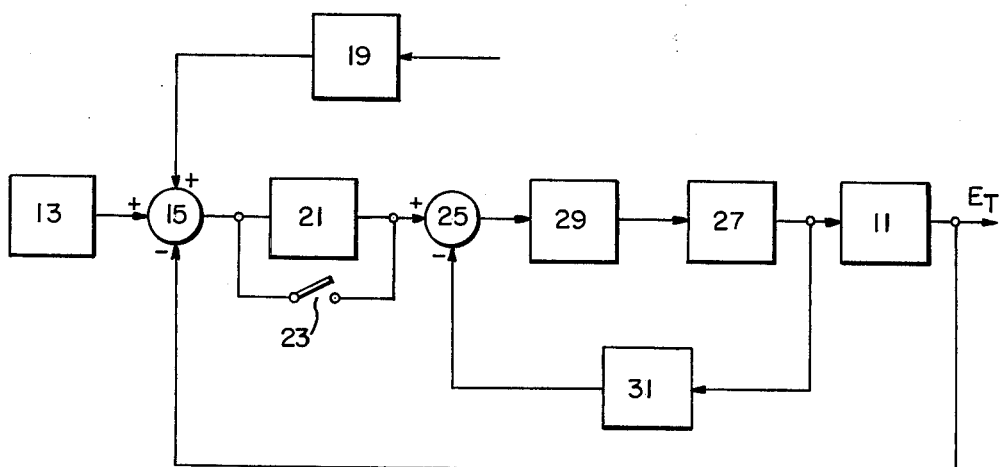
FIG. 1 is a schematic block diagram illustrating a preferred embodiment of the present invention.

A preferred embodiment of an arrangement for achieving the desired compensation is illustrated in FIG. 1. It should be recognized that while the embodiment of FIG. 1 is particularly useful, other arrangements utilizing a complex root compensating network could be realized. In other words, the embodiment disclosed is merely illustrative in nature.

In FIG. 1, a synchronous generator 11 is schematically illustrated. It should be noted that while this description is made with respect to a synchronous generator, the invention is equally applicable to any synchronous dynamoelectric machine.

To provide the desired complex root compensation for a synchronous generator 11, a reference source 13 produces a reference signal which is conveyed to a first summing node 15. A feedback signal indicative of the terminal voltage $E_T$ of synchronous generator 11 is also applied to summing node 15 through the feedback line 17. A supplementary feedback arrangement 19 may also be utilized to provide a supplementary signal to summing node 15. Use of the supplementary feedback signal is optional and need only be used if so desired for a particular usage. If used the supplementary signal from the supplementary feedback arrangement 19 will be representative of a machine parameter, such as the power, frequency, speed or voltage.

The output of summing node 15 is then conveyed to a complex root compensating network 21. A switch 23 may be employed to permit bypassing of compensating network 21, if desired. The output of compensating network 21 is then applied to a second summing node 25. While compensating network 21, in this preferred embodiment, is located between summing nodes 15 and 25, it should be recognized that the compensating network could be located in other portions of the circuit. For instance, the compensating network 21 could be located in the feedback line 17, or, if a supplementary feedback source 19 is utilized, the compensating network 21 could be located in the supplementary feedback signal line, or two compensating networks could be used.

The output of summing node 25 is then conveyed to an excitation source 27, such as a rotary exciter, in order to modify the excitation applied to the field winding of synchronous generator 11 in accordance with the function of the complex root compensating network 21. In this preferred embodiment, a voltage regulator 29 is utilized to provide appropriate regulation. As is well known in the art, a feedback from the output of exciter 27 to the input of voltage regulator 29 is made through a damping module 31. Damping module 31 serves to prevent an overshoot and subsequent oscillation of the output of exciter 27 that might otherwise exist as a result of the delay in the response of exciter 27 to an input signal.

Figure 2:
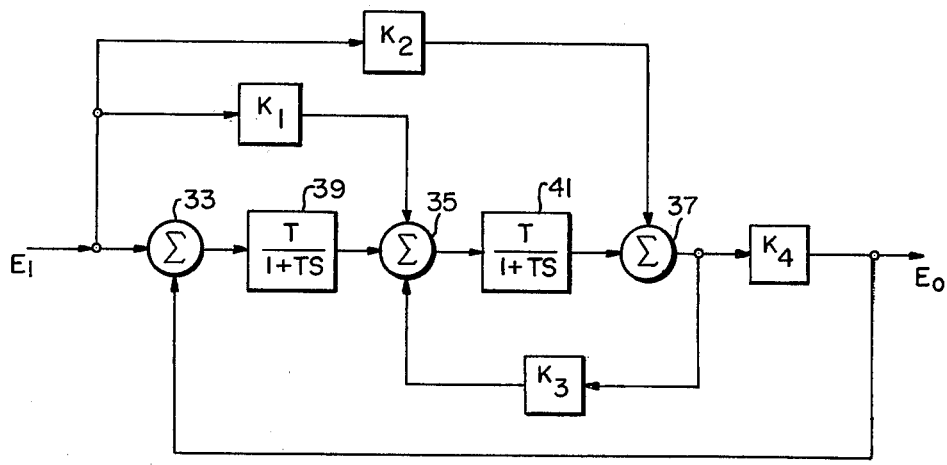
FIG. 2 is a schematic block diagram of a preferred embodiment of the complex root compensating network employed in the present invention.

While compensating network 21 may take any appropriate form that serves to eliminate, or at least minimize, the effects of the complex root function, a preferred embodiment of this network is illustrated in FIG. 2. As may be seen in that figure, three summing nodes 33, 35 and 37, two integrator circuits 39 and 41, and four constant parameters $K_1$, $K_2$, $K_3$ and $K_4$ are involved. Integrator circuits 39 and 41 are approximated in this embodiment by simple time delay circuits of the form: $T/(1 + TS)$. Other integrator circuits could be utilized.

To explain the structure of the network of FIG. 2, an input signal $E_i$ and an output signal $E_o$ are utilized. Thus, it may be seen that the input signal $E_i$ and the output signal $E_o$ are applied to summing node 33, which compares these signals and produces a signal that is applied to integrator circuit 39. The output of integrator circuit 39 is conveyed to summing node 35, together with the input signal $E_i$ as modified by the constant parameter $K_1$. The output of summing node 35 is connected to the second integrator circuit 41, which conveys an output to summing node 37. Another input for summing node 37 is the input signal $E_i$, as altered by the constant parameter $K_2$. The output summing node 37 is altered by constant parameter $K_3$ and fed back to summing node 35. The output signal $E_o$ is obtained by altering the output of summing node 37 by constant parameter $K_4$.

With the arrangement shown in FIG. 2, the transfer characteristic of the complex root compensating network, assuming $T = 10$ seconds, may be expressed as:

$$\frac{E_o}{E_i} = K_2 K_4 \frac{S^2 + (0.2 + K_1)S + \left(\frac{1}{K_2} + 0.1 K_1\right)}{S^2 + (0.2 + K_3)S + (K_4 + 0.1 K_3)}$$

By appropriate adjustment of the constants $K_1$, $K_2$, $K_3$ and $K_4$, a compensating network is provided that effectively minimizes the undesired machine characteristics resulting from the complex root function $G_2(S)$. Adjuxtment of the constants $K_1$, $K_2$, $K_3$ and $K_4$ may either be done manually or automatically (adaptive control).

Figure 3:
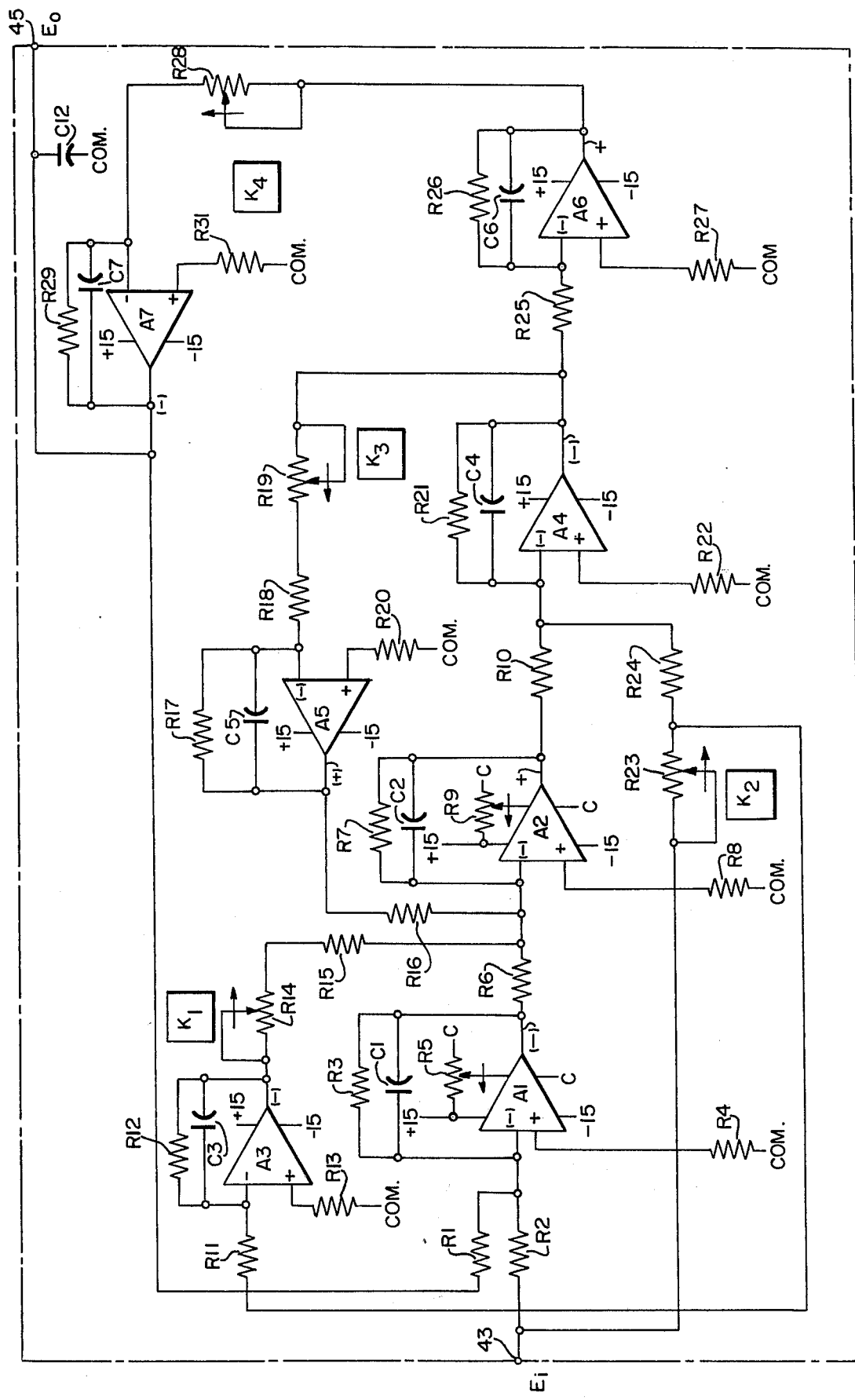
FIG. 3 is a schematic circuit diagram illustrating the complex complex root compensating network of FIG. 2 in greater detail.

A detailed circuit for the compensating network of FIG. 2 is illustrated in FIG. 3. It may be seen that the function of integrators 39 and 41 is achieved by operational amplifiers A1 and A2, with their associated circuitry. The constants $K_1$, $K_2$, $K_3$ and $K_4$ are shown by the variable resistors that permit adjustment of these constants. However, the actual values of the constant may be given as follows:

$$K_1 = \frac{(R7)(R12)}{(R11)(R14 + R15)}$$

$$K_2 = \frac{R21}{R23 + R24/2}$$

$$K_3 = \frac{R17}{R18 + R19}$$

$$K_4 = \frac{R29}{R25 + R30}$$

The input signal $E_i$ is applied to terminal 43 and the output signal $E_o$ is obtained from terminal 45. In view of the foregoing description, the operation of the various elements in this circuit are readily ascertainable.

Although the invention has been fully shown and described, above, even greater detail is supplied by listing below the values of the elements of the circuit in FIG. 3:

| | | |
|---|---|---|
| A1,A2 | - | ADO-29B operational amplifiers |
| A3-A7 | - | 741 operational amplifiers |
| R1,R2, R6,R11,R15, R16,R24 | - | 100 KOHM, 1%, ¼ watt resistors |
| R3,R7 | - | 1 megohm, 1%, ¼ watt resistors |
| R4,R8 | - | 47 kohm, 5%, ½ watt resistors |
| R5,R9,R19 | - | 50 kohm, 5%, ½ watt trimpots |
| R10,R21, R25,R26 | - | 10 kohm, 1%, ¼ watt resistors |
| R12 | - | 25 kohm, 1%, ¼ watt resistor |
| R13,R20, R22,R27 | - | 4.7 kohm, 5%, ½ watt resistors |
| R14 | - | 1 megohm, 5%, ½ watt trimpot |
| R17 | - | 12 kohm, 1%, ½ watt resistor |
| R18 | - | 4.75 kohm, ¼ watt resistor |
| R23 | - | 500 kohm, 5%, ½ watt trimpot |
| R28 | - | 10 kohm, 5%, ½ watt trimpot |
| R29 | - | 200 kohm, 1%, ¼ watt resistor |
| R30 | - | 1 kohm, 1%, ¼ watt resistor |
| R31 | - | 2.2 kohm, 5%, ½ watt resistor |
| C1,C2 | - | 10 microfarad capacitors |
| C3-C6 | - | 0.1 microfarad capacitors |
| C7,C8 | - | 0.01 microfarad capacitors |

It should be understood that various modifications, changes and variations may be made in the arrangements, operations and details of construction of the elements disclosed herein without departing from the spirit and scope of the present invention.

I claim:

1. A power generating arrangement having an improved dynamic and transient stability characteristic comprising:
   a dynamoelectric machine;
   an excitation source to provide excitation for the field winding of said dynamoelectric machine, the terminal voltage of said dynamoelectric machine varying with the field voltage of the field winding in a manner that may be approximately represented by a constant, a real root function and a complex root function;
   compensating means for controlling said excitation source, said compensating means producing an effect on the relationship between the field voltage and the terminal voltage that approximates the inverse of said complex root function over a desired operating range and comprising:
   means for developing an input reference signal;
   a first summing node having the input reference signal and also an output signal representing the terminal voltage applied thereto to produce a signal based upon a comparison thereof;
   a first integrator circuit connected to the output of said first summing node;
   a second summing node having means for modifying the input reference signal by a first constant; the first modified reference signal and the output of said first integrator circuit applied thereto;
   a second integrator circuit having the output of said second summing node applied thereto;
   means for modifying the input reference signal by a second constant;
   a third summing node having the output of said second integrator circuit and the second modified input reference signal applied thereto;
   means for modifying the output of said third summing node by a third constant and supplying the modified output of said third summing node back to said second summing node; and
   means for modifying the output of said third summing node by a fourth constant to provide the output signal.

2. A power generating arrangement as claimed in claim 1 wherein:
   said excitation source for the field winding is a rotary exciter; and
   said compensating means controls the output of said rotary exciter.

3. A power generating arrangement as claimed in claim 1 and further comprising supplementary feedback means to supply a supplementary signal indicative of a machine parameter to said first summing node.

4. A power generating arrangement as claimed in claim 1 wherein said first and second integrator circuits comprise time delay circuits.

5. A power generating arrangement as claimed in claim 1 wherein said first second, third and fourth constants may be adjusted to provide the desired modification of the compensating network for the purpose of controlling field winding excitation.

6. A power generating arrangement having an improved dynamic and transient stability characteristic comprising:
   a synchronous dynamoelectric machine;
   a rotary exciter to provide excitation for the field winding of said dynamoelectric machine, the terminal voltage of said dynamoelectric machine varying with the field voltage of the field winding in a manner that may be approximately represented by a constant, a real root function and a complex root function;
   a voltage regulator to regulate the excitation voltage produced by said rotary exciter;
   a reference source to provide a reference signal indicative of a desired excitation to be applied to the field winding;
   feedback means to provide a feedback signal indicative of the terminal voltage of said dynamoelectric machine;
   a first summing node to produce a control signal for said rotary exciter based upon a comparison of said reference signal and said feedback signal; and
   compensating means for controlling said rotary exciter to cause the excitation of the field winding to be modified to minimize the effects of said complex root function on the relationship between the field voltage and terminal voltage, said compensation means being a compensating network having means for an input signal and an output signal and comprising:
   a second summing node having the input signal and the output signal applied thereto to produce a signal based upon a comparison thereof;
   a first integrator circuit connected to the output of said second summing node;
   a third summing node having the input signal altered by a first constant altering means and the output of said first integrator circuit applied thereto;
   a second integrator circuit having the output of said third summing node applied thereto; and
   a fourth summing node having the output of said second integrator circuit and the input signal altered by a second constant altering means applied thereto, the output of said fourth summing node being altered by a thrid constant altering means and connected back to said third summing node and being altered by a fourth constant altering means to provide the output signal to said exciter.

7. A power generating arrangement as claimed in claim 6 and further comprising supplementary feedback means to supply a supplementary signal indicative of a machine parameter.

8. A control system for improvinng the dynamic and transient stability characteristic of a dynamoelectric machine comprising:

an excitation source to provide excitation for the field winding of the dynamoelectric machine, the terminal voltage of the dynamoelectric machine varying with the field voltage of the field winding in a manner that may be approximately represented by a constant, a real root function and a complex root function;

compensating means for controlling said excitation source to cause the excitation of the field winding to be modified by minimizing the effects of said complex root function on the relationship between the field voltage and the terminal voltage;

a reference source to provide a reference signal indicative of a desired excitation to be applied to the field winding;

feedback means to provide a feedback signal indicative of the terminal voltage of the dynamoelectric machine;

supplementary feedback means to supply a supplementary signal indicative of a parameter of the dynamoelectric machine;

a first summing node to produce a control signal for said excitation source based upon a comparison of said reference signal, said feedback signal and said supplementary signal;

a second summing node having applied thereto said control signal and the output of said excitation source after passage through a damping module;

a voltage regulator to convey the output of said second summing node to said excitation source and to regulate the excitation applied to the field winding; and said compensating means is a compensating network having an input signal and an output signal and comprises:

a third summing node having the input signal and the output signal applied thereto to produce a signal based upon a comparison thereof;

a first integrator circuit connected to the output of said third summing node;

a fourth summing node having the input signal altered by a first constant and the output of said first integrator circuit applied thereto;

a second integrator circuit having the output of said fourth summing node applied thereto; and a fifth summing node having the output of said second integrator circuit and the input signal altered by a second constant applied thereto, the output of said fifth summing node being altered by a third constant and connected back to said fourth summing node and being altered by a fourth constant to provide the output signal.

9. A control system as claimed in claim 8 wherein means for adjusting said first, second, third and fourth constants are provided for the desired modification of the field winding excitation.

* * * * *